United States Patent
Fujito et al.

(10) Patent No.: US 7,058,429 B2
(45) Date of Patent: Jun. 6, 2006

(54) SYSTEM AND METHOD FOR DISTRIBUTING RING TONE DATA USED FOR GENERATING RING TONE OF MOBILE PHONES

(75) Inventors: Yasuhisa Fujito, Tokyo (JP); Teruyuki Kobayashi, Tokyo (JP); Kosuke Furuse, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 10/314,385

(22) Filed: Dec. 9, 2002

(65) Prior Publication Data

US 2003/0109251 A1 Jun. 12, 2003

(30) Foreign Application Priority Data

Dec. 12, 2001 (JP) .................................. 2001-379297

(51) Int. Cl.
*H04B 1/38* (2006.01)

(52) U.S. Cl. ................................................ 455/567
(58) Field of Classification Search ................ 455/567, 455/415, 420, 414.1
See application file for complete search history.

(56) References Cited

FOREIGN PATENT DOCUMENTS

| JP | 10-173737 | 6/1998 |
|---|---|---|
| JP | 10-178679 | 6/1998 |
| JP | 2001-36968 | 2/2001 |
| JP | 2001-78271 | 3/2001 |
| JP | 2001-237915 | 8/2001 |
| JP | 2001-237986 | 8/2001 |
| JP | 2001-251431 | 9/2001 |
| JP | 2001-318673 | 11/2001 |
| WO | WO 98/25397 | 6/1998 |
| WO | WO 00/36857 | 6/2000 |
| WO | WO 01/24507 | 4/2001 |
| WO | WO 01/41403 | 6/2001 |

*Primary Examiner*—Creighton Smith
(74) *Attorney, Agent, or Firm*—Young & Thompson

(57) ABSTRACT

A method that allows users to use their favorite sounds (which may include human voices) as ring tones for their mobile phones. The method includes receiving a sound from a first mobile phone, generating ring tone data from the sound, storing the ring tone data in a server, receiving a download request from a second mobile phone, and sending the ring tone data from the server to the second mobile phone in response to the download request. The ring tone data is used for generating a ring tone of the second mobile phone.

11 Claims, 8 Drawing Sheets

MY RING TONE

"MY RING TONE" SERVICE ALLOWS
YOU TO UPLOAD AND DOWNLOAD
YOUR FAVORITE RING TONES OF
MOBILE PHONES.
THE RING TONES MAY BE YOUR VOICES,
OR NATURAL SOUNDS SUCH AS
SONGS OF BIRDS. ENJOY YOUR
FAVORITE RING TONE.

1. NOTICE (USERS ARE REQUESTED TO READ)
2. HOW TO USE "MY RING TONE" SERVICE
3. UPLOAD
   ∟"MY RING TONE" SERVICE BEGINS WITH
     UPLOADING YOUR FAVORITE RING TONE.
4. DOWNLOAD
   ∟DOWNLOAD TO ENJOY YOUR FAVORITE
     RING TONE !
5. GREETING
   ∟SEND YOUR RING TONE TO YOUR FRIENDS !

0. TOP OF "MY RING TONE"

Fig. 4

THE REQUESTED FILE IS UPLOAD
ON NOVEMBER 6, 2001.

DOWNLOAD

THE VOICE MESSAGE
FROM MR. (MS.) IS KEPT
FOR ANOTHER X HOURS.
PLEASE PUSH THE
BUTTON TO DOWNLOAD IT.

DOWNLOAD

SYSTEM AND METHOD FOR DISTRIBUTING RING TONE DATA USED FOR GENERATING RING TONE OF MOBILE PHONES

BACKGROUND OF THE INVENTION

1. Field of the Invention

The present invention relates to a system and method for distributing ring tone data that is used for generating ring tone of mobile phones.

2. Description of the Related Art

Mobile phones are often programmed to allow users to customize the ring tones thereof. Melodies, human voices, notes of birds, and other sounds can be used as ring tones of mobile phones. Customized ring tones amuse users, and also allow the users to identify incoming calls to their own mobile phones. Hoshina discloses in Japanese Open Laid Patent Application (Jp-A-Heisei 10-176879) that a mobile phone encodes a sound inputted by a user into a ring tone data, and generates a ring tone from the ring tone data when receiving incoming calls.

Ring tone data are often provided through a network. Network-based ring tone distribution systems are disclosed in Japanese Open Laid Patent Application (Jp-A-Heisei 10-173737, Jp-A 2001-36968, and Jp-A 2001-237915). The conventional network-based ring tone distribution systems provides ring tone data produced from melodies of singers and/or voices of famous talents.

In some cases, however, users may find that the provided ring tones data do not include their favorite ring tones. In addition, the systems do not allow users to use unique sounds as ring tones for their mobile phones. That is, the conventional system does not satisfy user's needs to use their own voices and the voices of their friends and family members as ring tones for their mobile phones. A need exists to provide a ring tone data distribution system that allows users to use their favorite sounds including human voices as the ring tones.

A technology which may be related to the present invention is disclosed in Japanese Open Laid Patent Application (Jp-A 2001-78271). The document discloses a mobile phone system for providing various data about the calling party before the called party answers the call. The information may include image data and/or audio data.

SUMMARY OF THE INVENTION

Therefore, an object of the present invention is to provide a ring tone data distribution system that allows users to use their favorite sounds (which may include human voices) as ring tones for their mobile phones.

Another object of the present invention is to provide a ring tone data distribution system that allows users to send their favorite ring tone data to other users.

In an aspect of the present invention, a method of distributing ring tone data to a mobile phone includes:

receiving a sound from a first mobile phone;
generating ring tone data from the sound;
storing the ring tone data in a server;
receiving a download request from a second mobile phone; and
sending the ring tone data from the server to the second mobile phone in response to the download request. The ring tone data is used for generating a ring tone of the second mobile phone.

It is advantageous if the method further includes:
providing a web site used for receiving the download request;
sending an e-mail from the server to the second mobile phone, the e-mail including an URL of the web site.

It is also advantageous if the method further includes:
receiving image data from the first mobile phone;
storing the image data in the server; and
sending the image data with the ring tone data in response to the download request.

The generating the ring tone data preferably includes:
modifying the sound; and
producing the ring tone data from the modified sound.

The modifying the sound may include modifying a key of the sound.

In another aspect of the present invention, a ring tone data distribution system is composed of a ring tone data generating unit and a server. The ring tone data generating unit receives a sound from a first mobile phone and generates ring tone data from the sound. The ring tone data is used for generating a ring tone of the second mobile phone. The server stores therein the ring tone data, and sends the ring tone data to the second mobile phone in response to a download request.

It is advantageous that the server is programmed to provide a web site on the Internet to receive the down request through the web site, and to send an e-mail including an URL of the web site.

The server preferably is programmed to receive image data from the first mobile phone to store therein, and to send the image data with the ring tone data in response to the download request.

The ring tone data generating unit preferably modify the sound in response to the user's request, and generates the ring tone data from the modified sound. In this case, the ring tone data generating unit may modify a key of the sound.

DESCRIPTION OF THE PREFERRED EMBODIMENTS

The present invention will be described in detail with reference to the accompanying drawings.

First Embodiment

Figure 1:
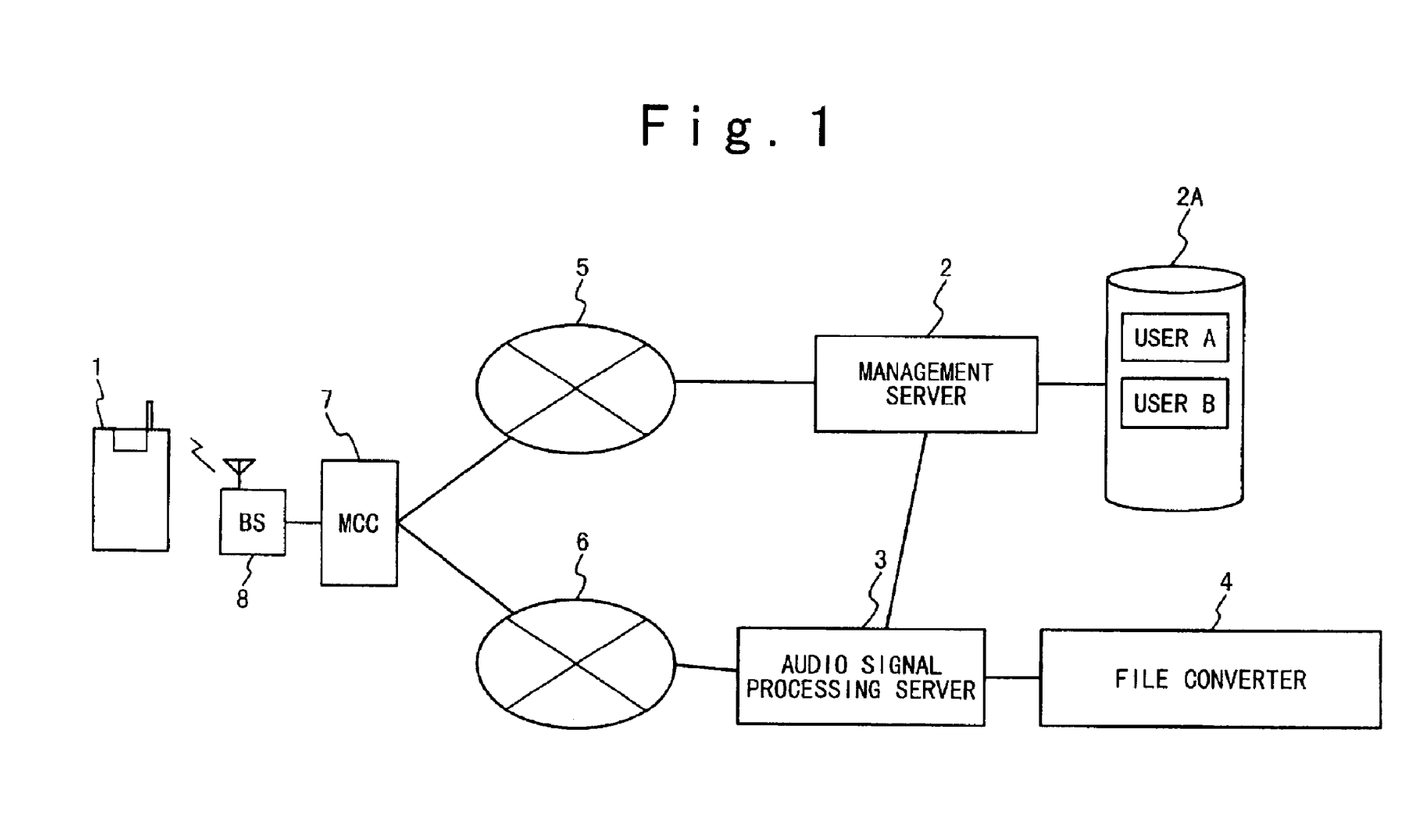
FIG. 1 is a schematic block diagram of a ring tone data distribution system in a first embodiment according to the present invention.

FIG. 1 is a schematic block diagram of a ring tone data distribution system in a first embodiment of the present invention. The system is provided with a management server 2 and an audio signal processing server 3. The management server 2 is connected to the audio signal processing server 3 by through a communications line. The management server 2 is connected to mobile communication control station (MCC) 7 through a packet transmission network 5. The audio signal processing server 3 is connected to the MCC 7 through a public switched telephone network (PSTN) 6. The MCC 7 accommodates a mobile phone 1 through a base station 8.

The mobile phone 1 is programmed to allow the user to customize the ring tone thereof. In other words, the mobile phone 1 is provided with a functional feature of using a human voice or the like as its ring tone.

The mobile phone 1 is also programmed to be able to access the Internet (not shown) through the packet transmission network 5. The mobile phone 1 is provided with a mailer and a browser. The mailer allows the user to send and receive e-mails through the Internet, and the browser allows the user to browse WWW web sites. An i-mode™ terminal provided by NTT Docomo in Japan can be used as the mobile phone 1.

The management server 2 manages the ring tone distribution service. The management server 2 is programmed to register various data on the users authorized to receive the ring tone distribution service.

In addition, the management server 2 is programmed to store ring tone data uploaded by the users in a database 2A, and to send the ring tone data to the mobile phone 1 in response to a download request. The users are respectively provided with storage regions in the database 2A to store their uploaded ring tone data.

Figure 3:
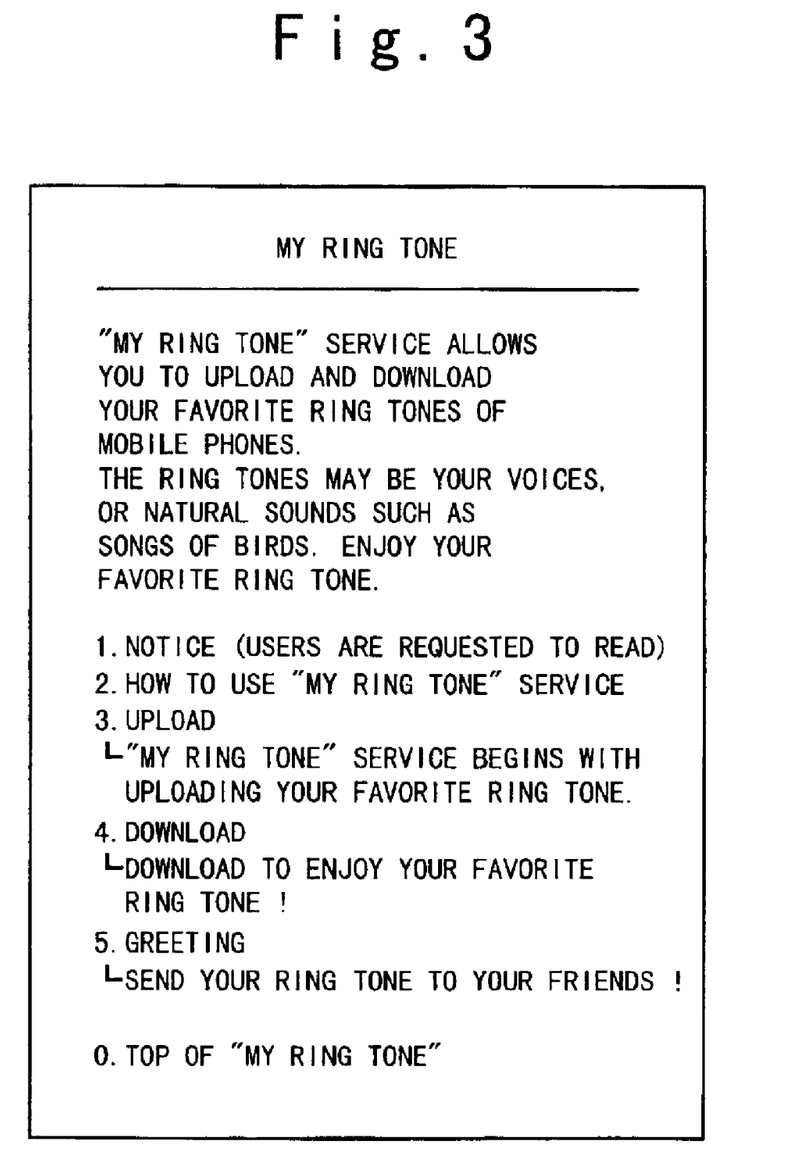
FIG. 3 is a schematic illustration showing an example of a "My ring tone" web page displayed on the mobile phone 1.

The management server 2 is also programmed to provide a web site that is used for providing the ring tone data distribution service. The web site includes a user registration web page and a "My ring tone" service web page. As shown in FIG. 3, the "My ring tone" service web page allows the users to upload and download ring tone data.

The audio signal processing server 3 is programmed to execute audio signal processing. When an upload of ring tone data is requested by the user, the audio signal processing server 3 receives and records a sound transmitted from the mobile phone 1 to produce a voice data in the WAV format. As widely known in the art, the WAV format is the standard format for computers to treat sound data. The audio signal processing server 3 converts the voice data in the WAV format into sound data in an MLD format with the file converter 4. The MLD format is often used for treating voice data in mobile phones such as i-mode terminals. The mobile phone 1 is adaptive to sound data in the MLD format. The audio signal processing server 3 sends the converted sound data to the management server 2, and the converted sound data is stored as the ring tone data in the database 2A.

Figure 2:
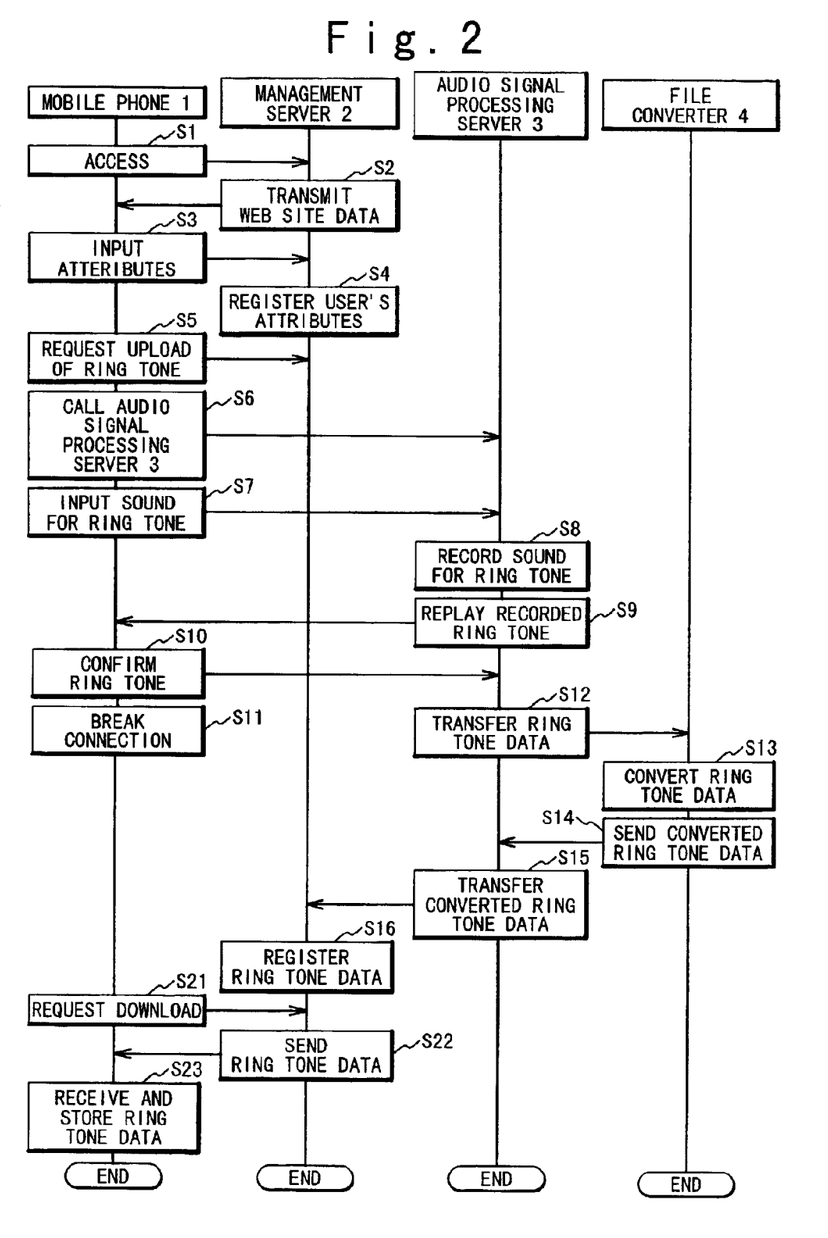
FIG. 2 is a schematic illustration of the sequence of operations of a ring tone data distribution system in the first embodiment.

FIG. 2 is a schematic diagram showing operations of the ring tone distribution system.

A user who wants to use the ring tone distribution service is required to register his or her attributions on the management server 2. The user registration is achieved through the user registration web page provided by the management server 2. A specific operation on the mobile phone 1 initiates an access to the web site provided by the management server 2 through the packet transmission network 5. Selecting a link on the web site causes the mobile phone 1 to send a request for an access to the user registration web page at Step S1. In response to the request of the access, the management server 2 transmits the data of the user registration page to the mobile phone 1 at Step S2.

The mobile phone 1 then displays the user registration page on the display screen thereof. The user registration page provides a format for inputting the user's attributes such as his name, his address, and the telephone number assigned to the mobile phone 1. Filling the format allows the user to send the user's attributes to the management server 2 at Step S3. The management server 2 stores the user's attributes in the database 2A to complete the user registration at Step S4, and secures in the database 2A a storage region for the registered user. The user registration allows the user to use the ring tone distribution service.

The ring tone distribution service allows the user to upload ring tone data in the following process.

The web site provided by the management server 2 includes a link to the "My ring tone" service web page. Selecting the link initiates the access to the "My ring tone" service web page as shown in FIG. 3.

Selecting the "3. Upload" button on the web page allows the mobile phone 1 to send a request for uploading the ring tone data to the management server 2 at Step S5. In response to the request, the management server 2 sends the telephone number to the audio signal processing server 3.

Selecting the "3. Upload" button also allows the mobile phone 1 to make a phone call to establish a connection to the audio signal processing server 3. When an i-mode terminal is used as the mobile phone 1, the connection may be achieved through a "PHONE TO" function that allows the user to make a phone call by pushing a key while accessing to the Internet. The audio signal processing server 3 identifies the calling user by the telephone number received from the management server 2 and from the mobile phone 1.

After the connection is established, the audio processing server sends a voice guidance to the mobile phone 1 to request the user to input his or her favorite sound for producing the ring tone data.

The voice guidance may be "With the "My ring tone" service, you can upload your favorite sound as a ring tone for mobile phones. Now, please start recording. Input your favorite sound within a second after a click sound. Push the "#" key after the recording."

The user inputs his or her favorite sound the mobile phone 1 at Step S7. The sound may be the user's voice saying, "Cheer up for today". The audio signal processing server 3 records the sound to produce sound data in the WAV format at Step S8.

After recording the sound provided by the user, the audio signal processing server 3 replays the recorded sound by using the produced sound data for confirmation at Step S9. For instance, the audio signal processing server 3 may send a voice guidance, saying "The recorded voice is replayed now", and then replays the recorded sound on the mobile phone 1.

Hearing the sound replayed by the audio signal processing server 3 allows the user to confirm the recorded sound at Step S10. After replaying the recorded sound, the audio signal processing server 3 sends a voice guidance, typically telling "Please say 'Yes' or press '1' if you are satisfied with the replayed sound. Please say 'No' or press '2' if you want to replace it." When the user says 'Yes" or "No", the audio signal processing server 3 recognizes what the user says through a voice-recognition technology.

If the user answers "No" or presses the key "2" provided on the mobile phone 1, the process is repeated from the recording of the sound at Step S7 to the user's confirmation of the recorded sound at Step S10. This allows the user to replace the recorded sound when the user is not satisfied with the recorded sound.

When the user says, "Yes" or presses the key "1", the audio signal processing server 3 provides a voice guidance, typically saying "The ring tone data will be prepared immediately. You can download the ring tone data through the "My ring tone" service web page after the connection is broken." Then the audio signal processing server 3 break the connection between the mobile phone 1 and the audio signal processing server 3 at step S11.

The audio signal processing server 3 then transfers the sound data, which has the WAV format, to the file converter 4 at Step S12. The file converter 4 converts the sound data into the sound data that has the MLD format at Step S13, and transmits the converted sound data to the audio signal processing server 3.

After receiving the converted sound data from the file converter 4, the audio signal processing server 3 transfers to the management server 2 the converted sound data with a piece of information for identifying the user at Step S15. The information may be the telephone number of the mobile phone 1. The converted sound data is used as the ring tone data for generating ring tone for the mobile phones. Upon receiving the ring tone data from the audio signal processing server 3, the management server 2 stores the ring tone data in the region assigned to the user in the database 2A at Step S16.

Figure 4:
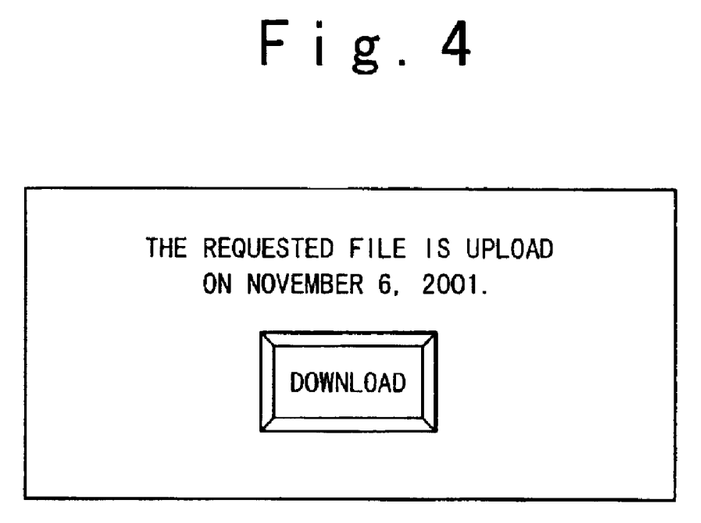
FIG. 4 is a schematic illustration showing an image for confirming ring tone data to be downloaded.

The user can download the ring tone data through the following process. A user who wants to download the ring tone data is required to access the "My ring tone" service web page as shown in FIG. 3. Selecting the "4. Download" button causes the management server 2 to display a web page on the mobile phone 1 to confirm the ring tone data to be downloaded as shown in FIG. 4. The web page includes a "Download" button. Selecting the "Download" button causes the mobile phone 1 to send a request for download of the identified ring tone data at Step S21.

Upon receiving the request for downloading from the mobile phone 1, the management server 2 queries the file of the identified ring tone data in the database 2A and transfers the ring tone to the mobile phone 1 through the packet transmission network 5 at Step S22.

The mobile phone 1 receives the ring tone data from the management server 2 at Step S23. The mobile phone 1 stores the ring tone data in a memory, and generates ring tones by using the downloaded ring tone data.

The ring tone data distribution system in this embodiment allows users to use their favorite sound for the ring tone of their mobile phones. This is an advantageous feature of the system in this embodiment. The conventional ring tone data distribution systems allows users to download only ready-made ring tone data, while the system in this embodiment allows users to use ring tones that are not ready-made. For instance, uploading his own voice to the management server 2 and downloading it to the user's mobile phone 1 allows the user to use his favorite sentience as the ring tone. Additionally, the system in this embodiment allows users to enjoy the voices of their family members and friends as the ring tones for the mobile phones. The system in this embodiment allows the users to freely customize the ring tones of mobile phones depending on the situation in their daily life.

Second Embodiment

In a second embodiment, the system is designed to allow users to modify the key of the ring tones while uploading the ring tone data. The control of the key of the ring tones is achieved by the following process.

In this embodiment, the audio signal processing server 3 is programmed to execute a key control of the recorded sound in response to the user's request.

As described with reference to FIG. 2, the audio signal processing server 3 replays the recorded sound for generating the ring tone data at Step S9. Then, the audio signal processing server 3 provides the voice guidance to prompt the user to confirm the recorded sound.

If the user confirms the recorded sound by answering "Yes" or pressing the key "1" on the keyboard at Step S10, the audio signal processing server 3 provides another voice guidance, typically saying "If you want to modify the key of the ring tone, please say 'Yes' or press '1'. If you don't want to regulate the key, please say 'No' or press '2'." The audio signal processing server 3 recognizes what the user says by the voice-recognition unit installed therein.

If the user says, "Yes" or presses the key "1", the audio signal processing server 3 provides another voice guidance, typically saying "If you want to raise the key of the ring tone, please say 'Yes' or press '1'. If you want to lower the tone, please say 'No' or press '2'."

In response to the user's action, the audio signal processing server 3 raises or lowers the key of the recorded sound by modifying the frequencies of the recorded sound. The audio signal processing server 3 then replays the modified recorded sound. After the replaying, the audio signal processing server 3 provides a voice guidance for prompting an answer for further modifying the key of the recorded sound. The audio signal processing server 3 repeatedly replays the modified recorded sound, and provides the voice guidance for prompting an answer for further modification until the user is satisfied.

When the audio signal processing server 3 recognizes that the user answers "No" or the user presses the key "2" in response to the inquiry to modify the key, the audio signal processing server 3 transfers the modified recorded sound to the file converter 4 at Step S12. The subsequent sequence of processing operation is same as explained in FIG. 2.

Thus, the system in this embodiment allows the user to modify the key of the sound recorded at the audio signal processing server 3, and thus the user can enjoy a ring tone different from the original sound.

In this embodiment, the system may alternatively be so designed that the key of the ring tone is modified by management server 2 after the ring tone data is registered in the database 2A. In this case, the ring tone data is transmitted from the management server 2 to the audio signal processing server 3 in the user's request, the key of the ring tone is modified by audio signal processing server 3, and then modified ring tone data is transmitted to the management server 2 to be stored in the database 2A.

Third Embodiment

In a third embodiment, the management server 2 provides an e-mail service to allow a user to inform another user that uploaded ring tone data is available. The e-mail may be referred to as a "greeting e-mail" hereinafter The configuration of the system in this embodiment is same as the one illustrated in FIG. 1, and thus is not described any further repeatedly.

Figure 5:
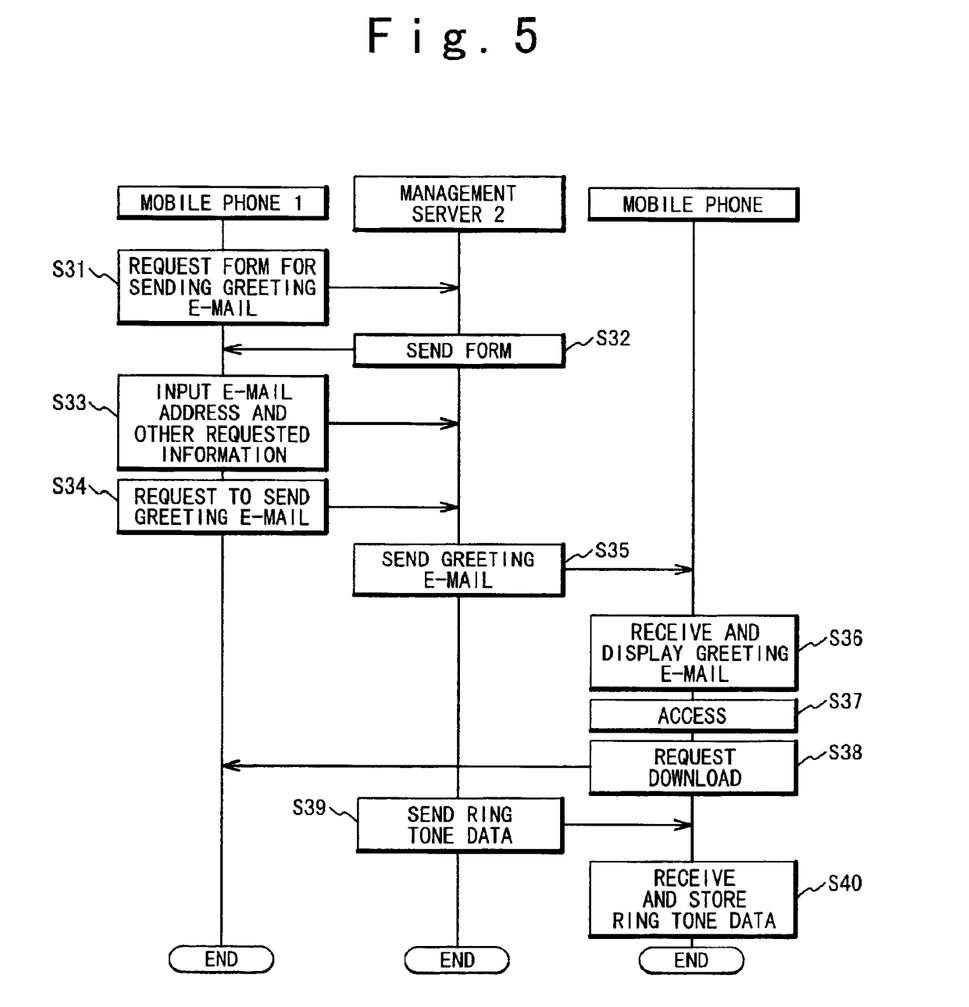
FIG. 5 is a schematic illustration of the sequence of operations of a ring tone data distribution system in a third embodiment.

FIG. 5 is a schematic illustration of the sequence of operation of transmitting an e-mail and that of downloading a ring tone data in this embodiment. It is assumed that the ring tone data is uploaded by a user (which may be referred to as a sender user) through the process from Step S1 to Step S16 described in the first embodiment.

The management server 2 provides the "greeting e-mail" service for the sender user through the "My ring tone" web page shown in FIG. 3.

With reference to FIG. 5, selecting "5. Greeting" button on the web page causes the mobile phone 1 to send a request for a form for inputting an e-mail address and other information needed to send a "greeting mail" at Step S31.

Figure 6:
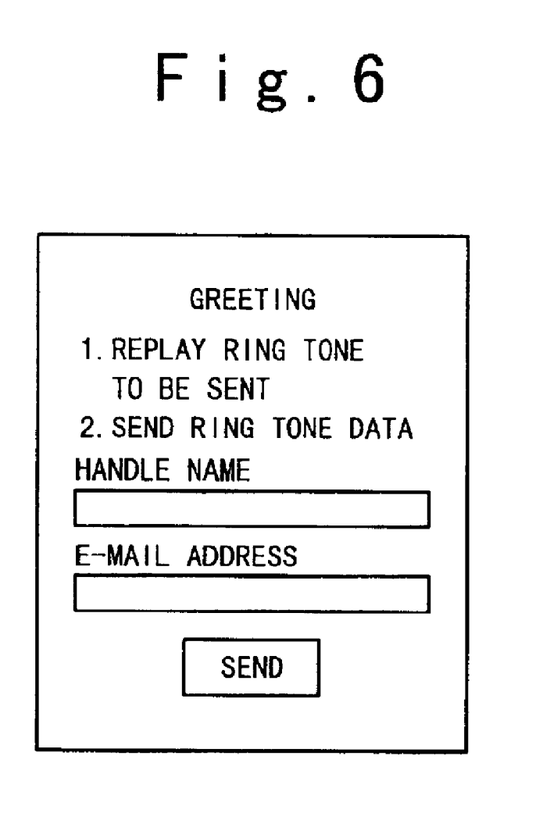
FIG. 6 is a schematic illustration of an image of a form used for sending a "greeting e-mail"

Then, in response to the request, the management server 2 provides the mobile phone 1 with the requested form at Step S32. FIG. 6 shows an example of the form. If the sender user selects "1. Replay ring tone to be sent" button, the management server 2 replays the ring tone. This allows the sender user confirm the ring tone that the user wants to inform the familiar person with.

The sender user is requested to input his or her name (or handle name) and the e-mail address of the addressee of the e-mail at Step S33. Clicking the "Send" button after filling the form causes the mobile phone 1 to send a request the management server 2 for transmitting the "greeting e-mail" at Step S34.

In response to the request, the management server 2 transmits the "greeting e-mail" to the inputted e-mail address at Step S35. The addressee may receive the "greeting e-mail" by his or her own mobile phone and display the received e-mail on the display screen of the mobile phone at Step S36.

The greeting e-email includes a message informing the addressee that ring tone data is uploaded by the sender. The message typically says, "A message is received from Mr. (Ms.) _ _ _".

The greeting e-email also includes the URL of a download web page provided by the management server 2. As described later, the download web page allows the addressee to download the ring tone data from the management server 2.

Figure 7:
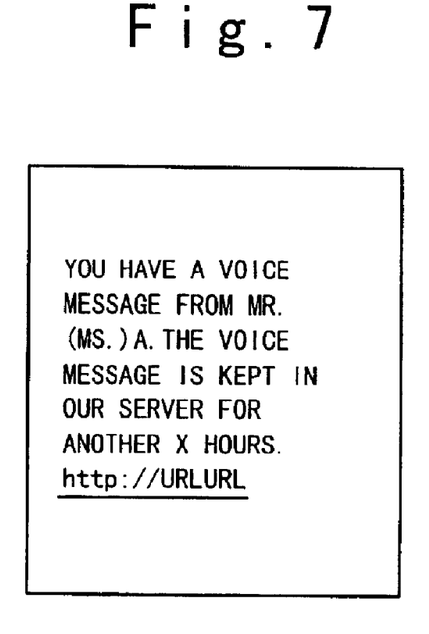
FIG. 7 is a schematic illustration of a "greeting e-mail"

If there is a time limit for the storage of users' ring tone data at the management server 2, the greeting e-mail may include the remaining time for storing the ring tone data of the user as shown in FIG. 7.

Figure 8:
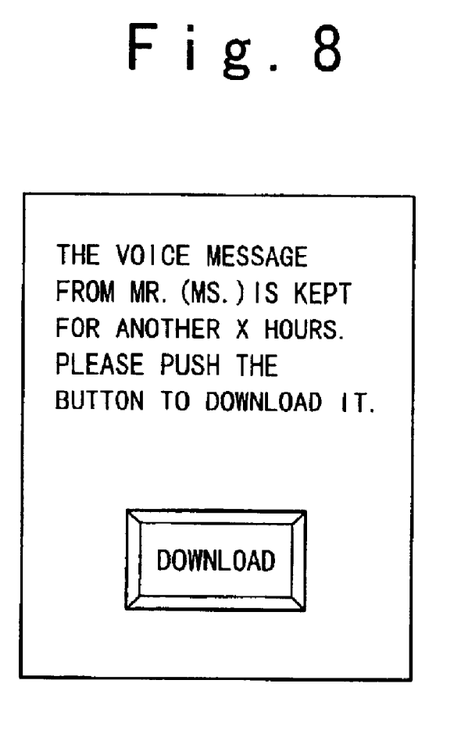
FIG. 8 is a schematic illustration of another image for confirming ring tone data to be downloaded.

With reference to FIG. 5, selecting the URL on the greeting e-mail allows the addressee to access the management server 2 at Step S37. When an i-mode terminal is used as the addressee's mobile phone, the access to the management server 2 may be achieved by "WEB TO" function. In response to the access, the management server 2 provides the download web page as shown in FIG. 8. The mobile phone of the addressee displays the web page on the display screen.

Selecting the "Download" button allows the addressee's mobile phone to send a request for download at Step S38.

Upon receiving the request for download, the management server 2 queries the ring tone data uploaded by the sender user in the database 2A, and transfers the ring tone data to the addressee's mobile phone through the packet transmission network 5 at Step S39.

The addressee's mobile phone receives and stores the ring tone data transferred from the management server 2 at Step S40. From then on, the addressee can utilize the downloaded ring tone data distributed by the management server 2.

As described above, the system in the third embodiment allows a sender user to send a "greeting e-mail" to an addressee to inform that the ring tone data is uploaded on the management server 2. This helps the sender user to provide the addressee with the ring tone data uploaded by the sender user, and allows the addressee to enjoy an amusing ring tone by downloading the ring tone data.

The system in this embodiment may be designed to allow the sender user to provide the addressee with an image data along with the ring tone data. In this case, the sender user is requested to upload the image data on the management server 2. When receiving the download request from the addressee's mobile phone, the management server 2 transmits the image data as well as the "greeting e-mail" to the addressee's mobile phone. Providing the image data along with the ring tone data operates the system as a novel and useful communication tool.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

For example, the ring tone data may be transmitted to the addressee's mobile phone along with the "greeting e-mail". That is, the ring tone data may be automatically downloaded from the management server 2.

In addition, it should be noted that the management system may be so designed that the management server 2 stores a plurality of ring tone data for each user in the database 2A. In this case, the user can select a ring tone data to be downloaded from the plurality of ring tone data. In the third embodiment, the sender user can send the selected ring tone data to the addressee. This allows the user to upload various messages to the management server 2 as ring tone data and select one of them as message to be sent to the addressee on the basis of the situations. For example, the user is allowed to send a ring tone data suitable for a wedding ceremony or a birthday.

What is claimed is:

1. A method of distributing ring tone data to a mobile phone comprising:

receiving a sound from a first mobile phone;

generating ring tone data from said sound;

storing said ring tone data in a server;

receiving a download request from a second mobile phone; and sending said ring tone data from said server to said second mobile phone in response to said download request, wherein said ring tone data is used for generating a ring tone of said second mobile phone.

2. The method according to claim 1, further comprising:

providing a web site used for receiving said download request;

sending an e-mail from said server to said second mobile phone, wherein said e-mail includes an URL of said web site.

3. The method according to claim 1, further comprising:

receiving image data from said first mobile phone;

storing said image data in said server; and sending said image data with said ring tone data in response to said download request.

4. The method according to claim 1, wherein said generating said ring tone data includes:

modifying said sound; and producing said ring tone data from said modified sound.

5. The method according to claim 1, wherein said modifying said sound comprises modifying a key of said sound.

6. A ring tone data distribution system comprising:
a ring tone data generating unit which receives a sound from a first mobile phone and generates ring tone data from said sound;
a server which stores therein said ring tone data, and sends said ring tone data to a said second mobile phone in response to a download request, wherein said ring tone data is used for generating a ring tone of said second mobile phone.

7. The ring tone data distribution system according to claim 6, wherein said server provides a web site on the Internet, and receives said download request through said web site, and
wherein said server sends an e-mail including an URL of said web site.

8. The ring tone data distribution system according to claim 6, wherein said server receives image data from said first mobile phone to store therein, and sends said image data with said ring tone data in response to said download request.

9. The ring tone data distribution system according to claim 6, wherein said ring tone data generating unit modifies said sound, and generates said ring tone data from said modified sound.

10. The ring tone data distribution system according to claim 9, said ring tone data generating unit modifies a key of said sound.

11. A computer-readable medium having a computer program saved thereupon, said computer program comprising the steps of:
receiving a sound from a first mobile phone;
generating ring tone data from said sound;
storing said ring tone data in a server;
receiving a download request from a second mobile phone; and
sending said ring tone data from said server to said second mobile phone in response to said download request, wherein said ring tone data is used for generating a ring tone of said second mobile phone.

* * * * *